United States Patent [19]

Ward

[11] Patent Number: 5,030,274
[45] Date of Patent: Jul. 9, 1991

[54] METHOD FOR RECOVERING METALLICS AND NON-METALLICS FROM SPENT CATALYSTS

[76] Inventor: Vincent C. Ward, 5228 Memorial Dr., Houston, Tex. 77007

[21] Appl. No.: 406,784

[22] Filed: Sep. 13, 1989

Related U.S. Application Data

[62] Division of Ser. No. 120,656, Nov. 16, 1987, Pat. No. 4,876,655.

[51] Int. Cl.$^5$ .............................................. C22B 4/00
[52] U.S. Cl. ...................................... 75/10.65; 75/631
[58] Field of Search ................................. 75/83, 10.65

[56] References Cited

U.S. PATENT DOCUMENTS

| | | | |
|---|---|---|---|
| 2,355,095 | 8/1944 | Moore | 13/10 |
| 3,218,050 | 11/1965 | Healy et al. | 263/46 |
| 3,429,973 | 2/1969 | Carter et al. | 13/9 |
| 3,967,048 | 6/1976 | Longenecker | 13/9 |
| 4,334,924 | 6/1982 | Kim et al. | 75/133.5 |
| 4,337,085 | 6/1982 | Cichy | 75/10 R |
| 4,349,381 | 9/1982 | Cichy | 75/10 R |
| 4,427,442 | 1/1984 | Day | 75/10 R |
| 4,428,768 | 1/1984 | Day | 75/10 R |
| 4,466,104 | 8/1984 | Walzel | 373/78 |
| 4,543,124 | 9/1985 | Vallomy | 75/46 |
| 4,639,927 | 1/1987 | Uno et al. | 373/84 |

OTHER PUBLICATIONS

"The New Bottom Pouring Electric Melter 'Combined Process Furnace' (CPF)", Mannesmann Demag Metallgewinnung, 12/79.

Primary Examiner—Peter D. Rosenberg
Attorney, Agent, or Firm—David A. Rose; Ned L. Conley; Jeffrey W. Tayon

[57] ABSTRACT

An electric arc furnace includes a crucible having a metal shell for recovering precious metals from spent material. The shell includes a metal tap hole and a slag door positioned above and opposite the metal tap hole. A removable swinging roof is provided above the crucible together with a plurality of electrodes for heating the spent material. Also, a cooling band circumscribes the crucible for cooling the metal shell. Conveyors are provided for distributing the spent material at a plurality of points located between the electrodes and the wall of the crucible. The crucible is tilted to allow the removal of the slag and metal.

22 Claims, 5 Drawing Sheets

METHOD FOR RECOVERING METALLICS AND NON-METALLICS FROM SPENT CATALYSTS

This is a divisional of co-pending application Ser. No. 07/120,656, filed on Nov. 16, 1987; now U.S. Pat. No. 4,876,655.

BACKGROUND OF THE INVENTION

1. Technical Field of the Invention

The present invention comprises the recovery of precious and heavy metals from spent catalyst materials.

2. Prior Art

The present invention comprises a furnace system for recovering precious and heavy metals from spent catalysts. Precious metal catalysts such as platinum, palladium and rhodium, and heavy metal catalysts such as nickel, cobalt and molybdenum are used in various industries such as the petrochemical industry, petroleum refining industry and the soap and detergent industry. Further, automobiles use catalytic converter pollution control devices which contain precious metal catalyst such as platinum, palladium and rhodium. These catalysts are generally employed in the form of supported catalysts wherein the metal is carried on the surface of a support or carrier composed of an inorganic ceramic material of an oxide such as aluminum oxide, silicon oxide, magnesium oxide, calcium oxide, zirconium oxide, or combinations thereof. The precious and heavy metals which may be recovered from these catalyst are valuable and the metals recovered therefrom may be recycled to produce new catalysts.

U.S. Pat. Nos. 4,337,085 and 4,349,381, both assigned to Kennecott Contortion, disclose a process for recovery of precious and heady metals from spent catalysts. Both patents disclose a spent catalyst furnace which may be an electric furnace of the arc type; however, other furnaces such as reduction or resistance electric furnaces are disclosed as alternatives. The patents are directed to the method of heating the spent catalyst in a spent catalyst furnace and then transferring the recovered alumina from the spent catalyst to an abrasive or refractory furnace for treatment with other materials to recover fused alumina. Both patents disclose the preferred method as making numerous pourings of the molten alumina from the spent catalyst furnace for transport to the abrasive or refractory furnace in a hot slag ladle or in a trough prior to the final deep pour to recover the precious or heavy metal from the spent catalyst furnace. The deep pour is into a mold or ladle wherein the materials are cooled, and then the precious or heavy metal recovered from the alumina after being broken apart and separated.

A process is disclosed in U.S. Pat. No. 4,334,924 for the recovery of molybdenum from a spent catalyst. A concentrated or enriched matte or alloy is recovered from a reverberatory furnace in a continuous operation in a furnace or ladle. This iron sulfide matte, which connotes a predominantly sulfide material, or alloy, which connotes a predominantly metallic material which may contain sulfur, is enriched by oxidizing the molten matte or alloy with air or oxygen in the furnace or ladle. It is disclosed that the oxygen is introduced through an oxygen lance. In this process the sulfur which is in the enriched molybdenum matte or alloy is oxidized so that the sulfur is removed in the form of gaseous sulfur oxides.

U.S. Pat. Nos. 4,427,442 and 4,428,768 discloses a method for the recovery of precious metals such as spent catalysts. This process is carried out in a plasma arc furnace. A molten metallic phase and a slag phase are formed in the plasma arc furnace and these two phases are separated so that the precious metal can be recovered from the metallic phase.

The present invention overcomes the deficiencies of the prior art apparatus and processes. None of the foregoing patents disclose a simple apparatus for recovering precious metals and the present invention provides an improved furnace system for efficiently separating precious and heavy metals from spent catalysts.

Other objects and advantages of the invention will appear from the following description.

SUMMARY OF THE INVENTION

The present invention is a furnace system for recovering precious and heavy metals. More specifically, the furnace system includes a tiltable electric arc furnace wherein precious and heavy metals are recovered from spent catalysts. The slag from the furnace is then introduced into a forehearth for recovery of additional precious and heavy metal.

BRIEF DESCRIPTION OF THE DRAWINGS

The present invention will be more readily apparent from the appended drawings.

DESCRIPTION OF THE INVENTION

Figure 1:
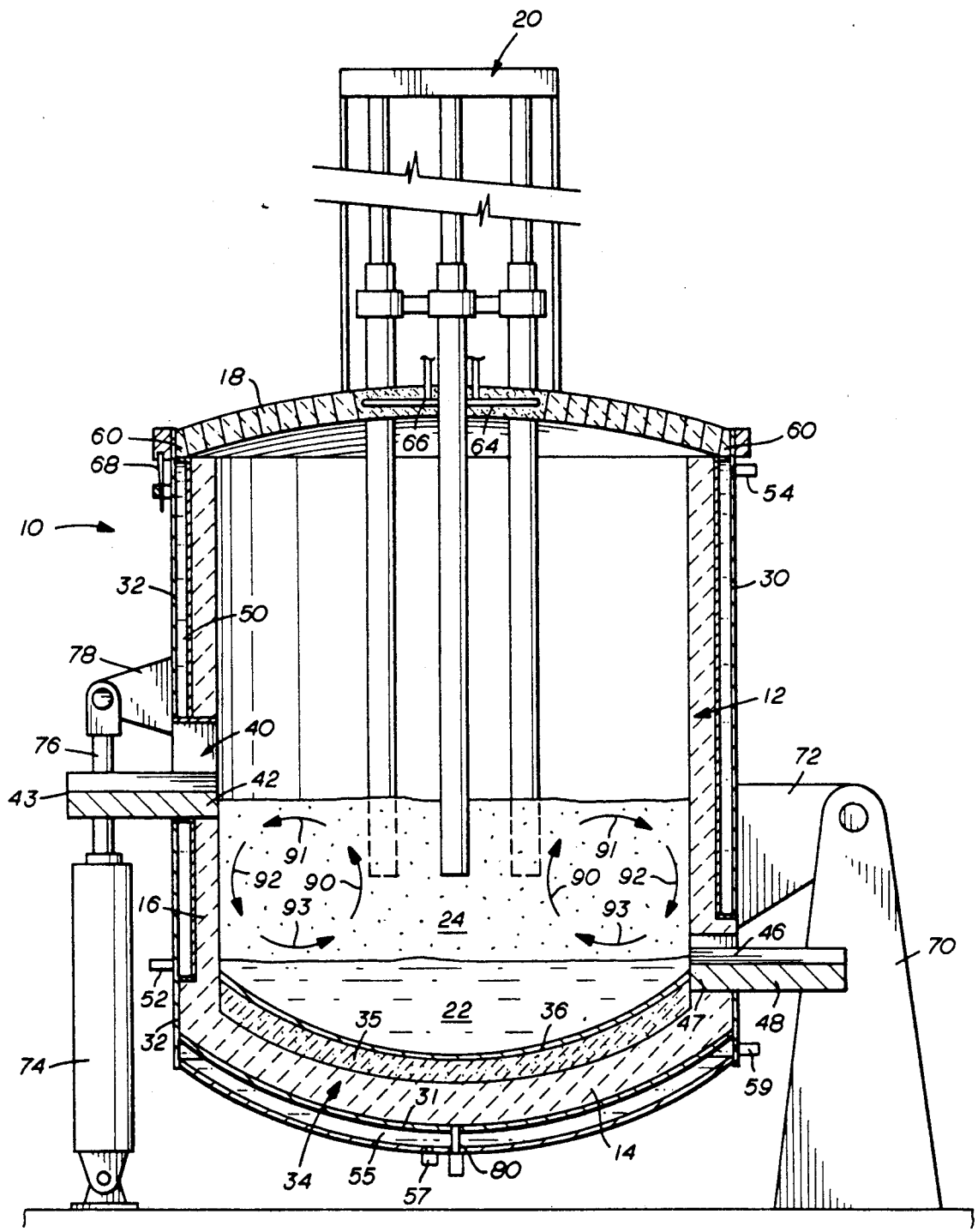
FIG. 1 is a cross-section of an elevation view of the electric arc furnace of the present invention.

Referring now to FIG. 1, the electric arc furnace 10 is a submerged arc furnace. The furnace 10 includes a crucible 12 having a concave bottom 14 and walls 16 extending upward from the bottom 14. The furnace 10 further includes a swingingly removable or hydraulically retractable roof 18 and has apertures through which the electrodes 20 pass. The feed material, preferably spent catalyst, introduced into the furnace 10 is heated by the electrodes 20 to form a metal phase 22 and a slag phase 24. In a submerged arc furnace, the electrodes 20 extend from the roof 18 and ar submerged into the slag phase 24.

The crucible 12 has an outer metal shell 30 having a concave bottom 31 and an upright wall 32. The metal shell supports the refractory material 34 making up the inside of the crucible 12. The preferred refractory material is in the form of a refractory brick but it may also be a castable refractory material such as castable concrete. It is preferred that the bottom of the crucible 12 is a layer of castable refractory concrete 35 which covers several layers of brick supported by the metal shell bottom 31. A concrete floor is preferred because it provides a continuous surface so as to prevent any precious or heavy metal from becoming lost within the interstices of a refractory brick. The floor of the crucible 12 may also include a layer of graphite 36 to provide a substantial continuous surface for containing the precious or heavy metals.

A slag door 40 is provided in the wall of the crucible 12 to allow removal of the slag. The slag door 40 preferably has a graphite lower portion 42 having a notch (which is shown and described hereinafter) so that the slag may be poured from crucible 12 through the notch of slag door 40. The graphite lower portion 42 extends to form a spout 43 so that the slag may be poured into a forehearth as will be more fully described hereinafter.

Below the slag door 40 and on the opposite side of the crucible 12 is a metal tap hole 46. The metal tap hole 46 may be an opening in a block of graphite 47. The metal tap hole 46 is usually cylindrical as that shape is easiest to tap and to refill. Extending from the block of graphite 47 is a spout 48 so that the metal may be easily poured into a receptacle.

The electric arc furnace 10 of the present invention will heat the feed materials to a temperature above the melting point of the materials so as to separate the precious or heavy metals from the non-metallic slag. To maintain the integrity of the furnace 10 at these high temperatures, the metal shell 30 is cooled. Cooling panels 50 circumscribe the upright wall 32. Panels 50 are connected internally such that cold water can be introduced at the bottom through inlet 52 and removed from an upper outlet 54. While cooling panels 50 are shown internally of outer metal shell 30, it is understood that labyrinths of piping or piping in block form may be disposed, either internally or externally of the shell 30. The cooling for the bottom metal shell 31 is a cooling panel 55 which may be of the same shape as the bottom metal shell 31 and is disposed externally thereof. The panel 55 has an inlet 57 and an outlet 59. Both the cooling panels 50 and the cooling panel 55 are attached or affixed to the metal shell 30. The panels 50 and 55 may include a plurality of sections and be interconnected by tubing or other means for the passage of cooling water or another cooling substance. The cooling is to aid in maintaining the temperature of the metal shell 30 so as to provide a firm structure for the refractory material 34.

The roof 18 of the electric arc furnace 10 is swingingly removable or hydraulically retractable. The roof 18 has a water cooled circular metal band 60, which is referred to as a skewback. The metal band 60 is triangular shaped for supporting the refractory brick which makes up most of the roof 18. Extending from the metal band 60 is a substantial seal lip 62 which is also metal, for lifting and swinging the roof 18 free from crucible 12. Details of the lifting and swinging mechanisms are set forth hereinafter. The roof 18 has a center section 64 which is preferably formed of refractory concrete. In the center section 64 is a cooling device 66. The cooling device 66 may be one or more cold water cooling tubes or other means for maintaining the cooling of center section 64. The seal lip 62 of the roof 18 has two or more centering pins 68 which are attached to lip 62.

Figure 3:
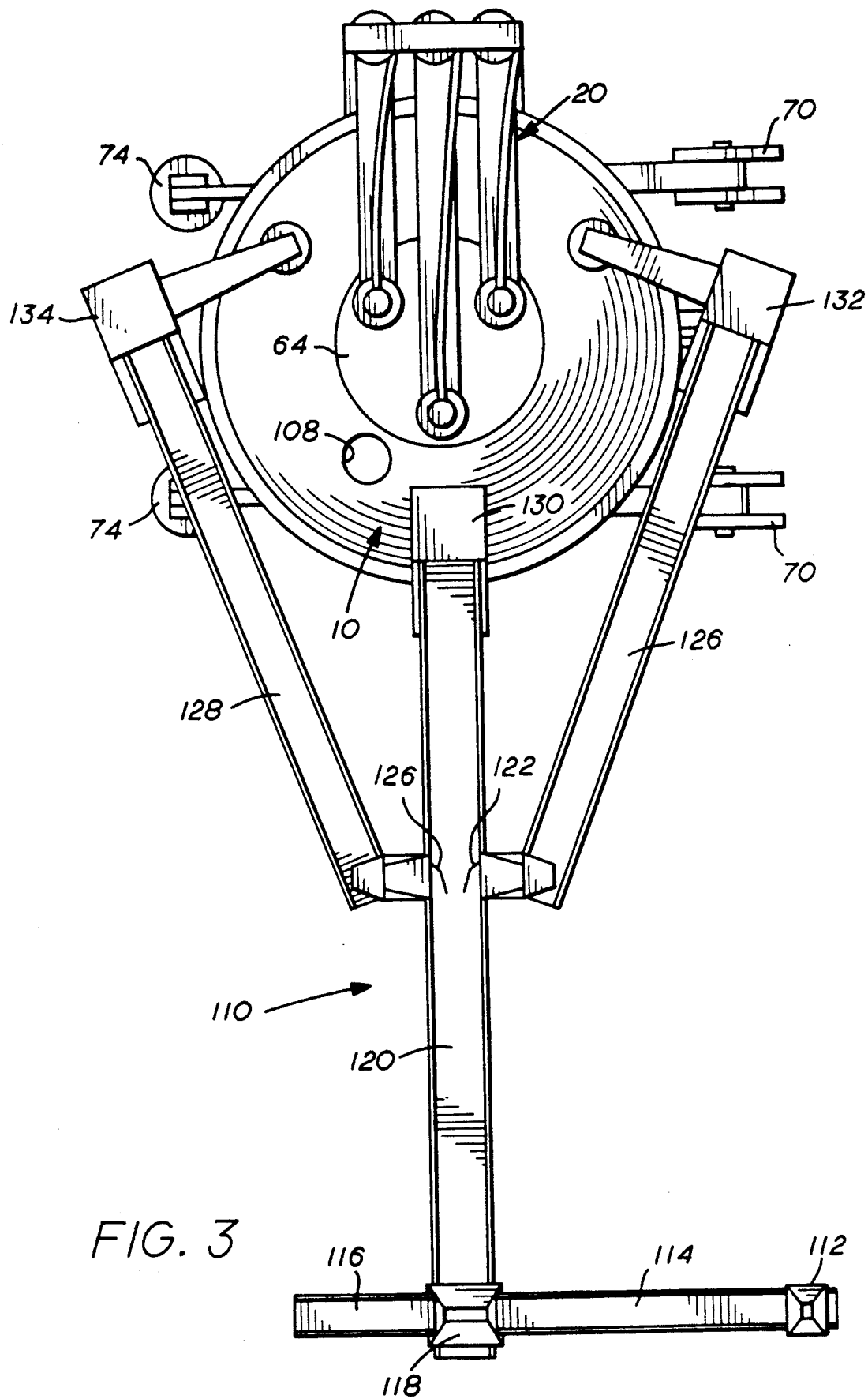
FIG. 3 is a top view of the tiltable electric arc furnace of FIG. 1 showing the conveyor system for feeding each of the electrodes.

The electric arc furnace 10 is tiltable through an arc which passes through the center of the slag door 40 and the metal taphole 46. On either side of that arc and supporting the crucible 12 are two fixed supports 70 having a pivoting structure 72. The pivoting structure 72 is secured to either side of the crucible 12. Opposite the fixed support 70 of the crucible 12 are a pair of jacks 74. The jacks 74 have a jackrod 76 which may be raised or lowered. The rod 76 is pivotally attached to a supporting structure 78 attached and extending from the side of the crucible opposite fixed supports 70 and equally spaced from the arc passing through the slag gate 40 and the metal taphole 46. FIG. 3 illustrates the positioning of supports 70 and jacks 74. The jacks 74 may be hydraulic, electrical or other mechanical means for raising and lowering the jack rod 76. The position shown in FIG. 1 maintains the metal phase 22 and slag phase 24 essentially horizontal. To remove slag through slag door 40 the jack rod 76 is lowered. As shown, furnace 10 need be only tilted slightly to remove substantial amounts of slag. As additional metal is heated, the slag build-up is much greater than the build-up of precious or heavy metal. When a substantial amount of metal phase 22 is built up, the metal is removed from the furnace 10. The tap hole 46 is tapped and the jack rod 76 is raised to completely empty the crucible 12 of the metal. The removal of precious or heavy metal is usually done only occasionally as compared to the removal of slag.

An optional feature of the electric arc furnace 10 is a lead metal drain 80. Lead has a very high density and has a tendency to seep through the refractory material 34. As the lead descends and collects along the metal shell bottom 31, it may be desired to have a tap hole 80 for removing the lead.

The crucible 12 of the electric arc furnace 10 may have a diameter which may be 4 feet or up to much larger diameters such as 12 feet or more. An electric arc furnace may be made having a smaller diameter. However, the economics of these furnaces usually require larger sizes. When using single phase alternating current to provide the electric arc, two electrodes are used. It is preferred, however, that alternating three-phase current be employed and that a three electrode configuration is employed as shown. The delta configuration shown for the three electrodes is preferred. In the delta configuration the electrodes are placed at the apex of an equilateral triangle. In some instances when the diameter of the crucible 12 is very large, six electrodes are utilized with two electrodes at each of the apexes of the equilateral triangles.

As pointed out hereinbefore, the furnace 10 is a submerged arc furnace with the electrodes submerged in the slag phase 24. The arc containing the slag heats the slag well beyond its melting temperature. The hot slag rises in the slag phase 24 as illustrated by arrow 90 and flows outward towards the walls as shown by the arrow 91. This movement brings the liquid slag in contact with the solid feed resting upon its surface causing the solid feed to melt and in so doing cool the slag which passes downwards as shown by the arrow 92 and inwards as shown by arrow 93. This flow is referred to as the convection flow of the slag phase 24. In addition there is an electromagnet stirring effect by the electrodes 20 which moves the slag phase 24 around the electrodes 20. This movement combined with the convection flow improves the melting of solid feed resting upon the surface of the slag phase 24.

In the absence of sufficient cooling effect by solid feed upon the slag phase 24, the extra heat is dissipated through the refractory 34 which is cooled by cooling water contained in panels 50, illustrating the necessity for panels 50 and the contained cooling water. When the power is introduced to the electrodes 20, the feed material is heated and the convection flow, as well as the stirring flow, of the heated material begins. As these flows begin, additional feed material is brought in contact with the slag and heated. This continues until all of the feed material has not only been heated, but is brought to its molten temperatures. When locking in the furnace as heating begins, the furnace is dark and eventually as all of the feed material is heated, the molten material will be visibly seen as a white heat. In the heating process the furnace refractory material which is not in contact with the melted slag is subjected to considerable amounts of radiant heat. This radiant heat is removed through the refractory material 34 and cooled by cooling panels 50 or the cooling device 66 in the roof 18. During the heating of the feed material to this white heat level and when substantially all the materials in the crucible 12 have been brought to their molten temperatures, the separation of the precious or heavy metal from the non-metallic slag takes place within the crucible 12. This separation actually occurs when the temperature is above the melting points of the composition of the material in the crucible. Upon separation, the precious and heavy metals will flow to the bottom of crucible 12 forming the metal phase 22.

Additional feed material is introduced after slag has been removed. In the operation of the furnace of the present invention, this may be accomplished continuously or in frequent batch additions of material. The heating process, which has been described, continues until again the feed material reaches the white heat indicating that the material has again been raised to its melting temperatures. Having arrived at the melting temperatures, the precious and heavy metals can separate and the metal phase 22 grows larger as feed material is introduced into the furnace 10. As an example, now feed material may be added each hour after removing slag from the slag door 40, whereas the heavy metal may be removed only once a day or the precious metal only once a week. Depending upon the particular feed material introduced into the furnace 10, the heating of all the materials to a white heat may take 50 to 55 minutes whereas the remainder of the time is to permit further settling of the metals to the bottom. In operating the electric arc furnace 10 in such a manner about 95% of the precious or heavy metals present in the feed material will pass to the lower metal phase 22. The remaining 5% will remain in the slag phase 24.

Figure 2:
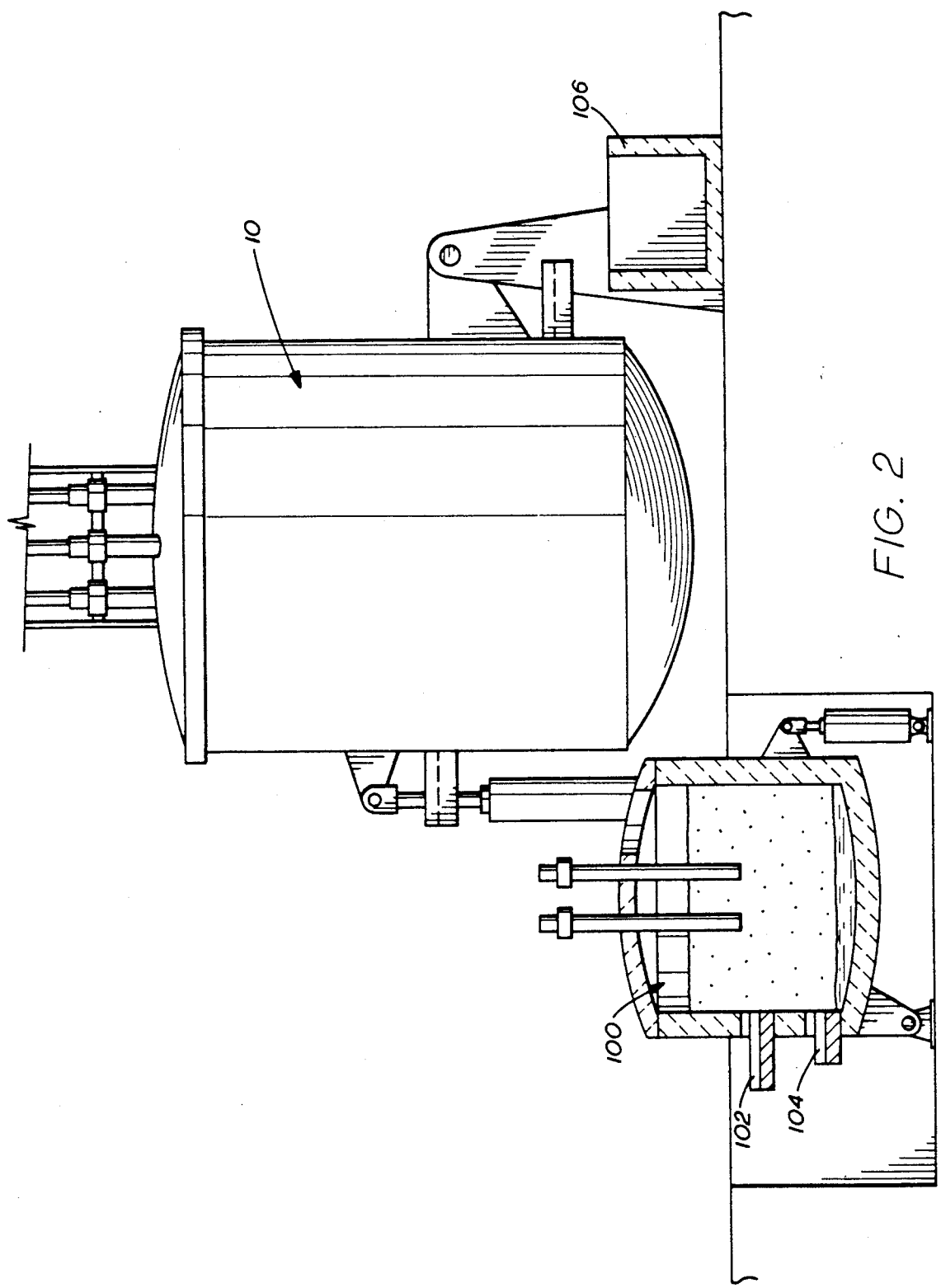
FIG. 2 is an elevation view of the furnace system which includes the tiltable electric arc furnace of FIG. 1 and a forehearth.

While recoveries of up to 95% are usually considered acceptable, it has been found that adding a forehearth electric arc furnace 100 to the furnace system as shown in FIG. 2 increases the efficiency of the recovery of the precious or heavy metals. As shown in FIG. 2, the slag is introduced into the forehearth furnace 100 from slag door 40 of furnace 10. The forehearth furnace 100 is preferably an electric arc furnace although it may be heated in other manners so long as the slag material is maintained in its molten state. In the forehearth furnace 100 the heated slag is maintained at a temperature and for the additional time such that further recovery of precious or heavy metal is obtained. The forehearth furnace 100 has a slag tap hole 102 and a metal tap hole 104 for removal of the slag and metal. The forehearth furnace 100 may also be a tiltable arc furnace as has been previously described herein. As shown in FIG. 2, the electric arc furnace is heated with a single phase alternating current two electrode system rather than the three electrode system of furnace 10; however, such a system is optional. It has been found that an additional 3% to 4% of precious or heavy metal can be recovered utilizing the forehearth furnace 100 for the continued heating of the slag removed from the electric arc furnace 10.

The slag material removed from the forehearth furnace 100 is a product which has value and accordingly may be placed into molds having a predetermined shape and size for the recovery of the slag materials. The precious or heavy metal either from the electric arc furnace 10 or the forehearth furnace 100 is poured into molds or ladles 106 appropriate for the processing of the precious or heavy metal to obtain its greatest sales value. The metals may be either utilized in a recycling process to be added to a base for catalyst production or may be further processed to recover the metal in a desired purity.

Referring now to FIG. 3, there is shown a top view of the electric arc furnace 10. The electrodes 20 are shown in FIG. 3 to have a structure which is conventional in the art with a power source and a support structure to each of the electrodes so that each electrode may be individually raised or lowered. Raising and lowering of each electrode maintains the current to each of the electrodes essentially equal. An electrode will erode during operation so that its usual cylindrical shape may change over time and thus change the current to that electrode. Adjustments are made to such current changes by raising and lowering the electrode. Further, it has been known for a portion of an electrode to break off requiring that that electrode be lowered within the slag phase 24 to again adjust the current to be substantially equal to that of the other electrodes. The broken off portion is usually removed from the furnace through the slag door 40.

Also in FIG. 3 the center section 64 of roof 18 is shown. The roof 18 has a water cooled gas outlet 108 which is connected to a filter system (not shown) in a bag house. In the bag house, most of the particles are recovered from the gases.

FIG. 3 shows the conveyor system 110 for feeding the feed material into the furnace 10. The conveyor system 110 for the electric arc furnace 10 is preferably includes a plurality of belt conveyors. The feed material is initially crushed or broken up prior to being fed into a feed bin 112. The feed bin 112 distributes the material onto a picking belt conveyor 114. This conveyor 114 runs at a convenient speed and level for a person to hand pick from the picking belt 114 tramp iron and other materials which are not desirable for introduction into the furnace 10. As much as possible, all magnetic iron is not introduced to the furnace 10 as it is a diluent. For example, the feed material may be the spent catalyst removed from automobile catalyst converters. In recovering the spent catalyst, the canister which contains the catalyst is guillotined for removal of the catalyst. Thus, the feed material may have parts of the cannister mixed with the spent catalyst. It is such material as the pieces of cannister and trash metal which are removed from the materials on the picking belt 114. Not only is the feed material such as spent catalyst added to the electric arc furnace 28, but materials such as calcium oxide to form the proper slag phase together with a reducing agent, when necessary, such as coke. These materials are added by belt conveyor 116. The material on belt 114 and 116 are added and mixed in a hopper 118 to be distributed on main belt conveyor 120. The belt conveyor 120 has two scrapers 122 and 124 which diverts some of the material on belt 120 onto two side conveyors 126 and 128. The main conveyor 120 has a substantial rise as it carries feed material to the top of the furnace 10 to be introduced through the roof 18 of the electric arc furnace 10. Scrapers 122 and 124 are positioned so that the removed feed material falls onto conveyors 126 and 128. Conveyors 126 and 128 are preferably belt conveyors. As can be seen in FIG. 3, each conveyor 120, 126 and 128 feeds one of the electrodes. The introduction of the feed material occurs between the electrode and the wall of the crucible 12. As the diameter of the furnace 10 increases, additional feed points may be desired. Also when the electrode diameters are large enough to cast a shadow between themselves, then a center feed point between the electrodes is provided.

At the end of conveyors 120, 126 and 128 respectively, are chutes 130, 132 and 134 for directing the feed material from the conveyors into the openings in the roof 18 of the furnace 10. In addition, the side chutes 132 and 134 are mounted so that the conveyors 126 and 128 may be swung clear of the furnace entirely. Usually only one conveyor 128 needs to be completely swung clear for tilting the furnace 10 when removing the metal from the metal tap hole 46.

Figure 4:
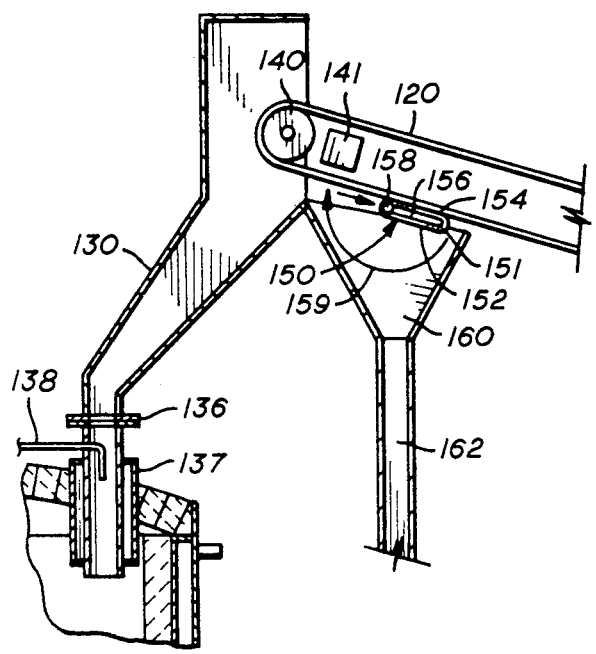
FIG. 4 is a cross-sectional detail of a portion of the conveyor shown in FIG. 3 with a beater bar for removing fines.

Since it is desired not to include any magnetic iron into the electric arc furnace 10, the picking belt conveyor 114 has a magnetic pulley at its upper end just before bin 118. The fine dust and small pieces of iron are attracted to the magnetic pulley and adhere to the belt so as not to be introduced into bin 118. It is desirable to remove the fine dust and small pieces of iron which have become adhered to the conveyor belt 114 and such material is removed by the use of a beater bar as will be described in more detail hereinafter. Optionally, a magnetic pulley or wheel may be used at the ends of conveyors 120, 126 and 128. The use of a magnetic pulley or wheel and a beater bar are illustrated in conjunction with conveyor 120 as shown in FIG. 4. A magnetic wheel or pulley 140 is at the upper end of conveyor belt 120. Alternately, if the pulley wheel 140 is non-magnetic, a point magnet 141 is used. As the feed material passes over pulley 140, the feed material is introduced into chute 130 for introduction into the furnace. Chute 130 may be connected by flanges 136 so as to be easily connected and disconnected. The chute includes a water-cooled portion 137 for maintaining the end of the chute cool. In addition, it is desired to have a positive pressure within the chute by the addition of a gas such as compressed air through line 138.

The beater bar 150 is an iron bar 151 having two parallel sides 152 and 154. Between the parallel sides is a closed slot 156. In the slot 156 is a shaft 158 which has a smaller diameter than the cross-section of the slot 156. Shaft 158 is positioned below the belt 120 at a distance from pulley or wheel 140 so that shaft 158 is located at the outer limit of the magnetic field of the magnetic, either wheel 140 or magnet 141. As shown in FIG. 4, the iron bar 151 which has adhered to the belt 120 is limited by shaft 158 and because it is out of the magnetic field, starts to fall away from the belt 120. The iron bar 151 moves in an arc 159. Because of the gravity in the swing, iron bar 151 passes upwardly where it enters the magnetic field of the magnetic wheel 140 where it is drawn into the belt 120 with a iron bar 151 thus the force hits upon the belt 120. As the bar 151 hits conveyor belt 120, it shakes loose the fines and small pieces of iron which have adhered to the belt 120. As those pieces fall from the belt 120, they are collected in collector 160 and removed separately by a line 162. After the iron bar 151 has swung up and adheres to belt 120 with the shaft 158 at the end of the bar as shown in FIG. 4, the other parallel side 152 is now adhered to the belt and the bar 151 moves down the belt until the shaft 158 engages the end of the slot 156. The repetitious falling of the bar and swinging up against the belt beats the fines from the belt, removing them from the belt.

Figure 5:
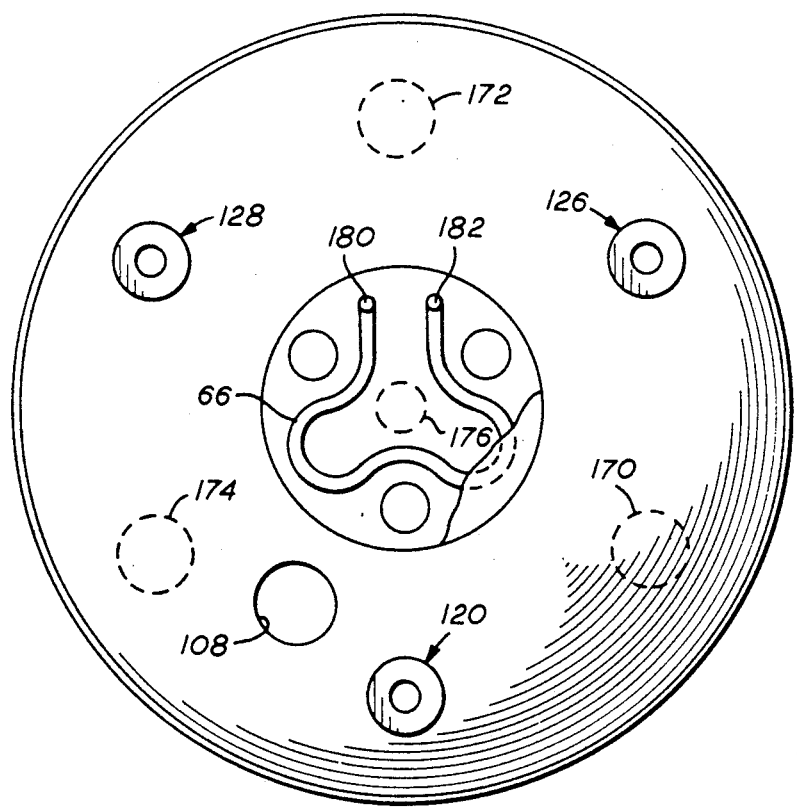
FIG. 5 is a top view of the furnace of FIG. 1 illustrating a swingingly removable roof and the delta section which is cooled.

Referring now to FIG. 5, there is shown the top of roof 18 without the electrodes 20 or the conveyor system 110. The inlets for conveyors 120, 126 and 128 are shown. In addition, alternate inlets 170, 172, 174 and central inlet 176 are shown in the event that additional ports are desired or the diameter of the furnace is large. In addition, the details of the center section of the roof 18 is shown wherein the cooling device 66 may be a single water tube with inlets 180 and an outlet 182. The rate of flow of water can be sufficient to provide the necessary coolant. Other configurations may also be employed. The cooling device 66 is shown with the electrodes in a delta configuration in the center portion 64 of the roof 18.

Figure 6:
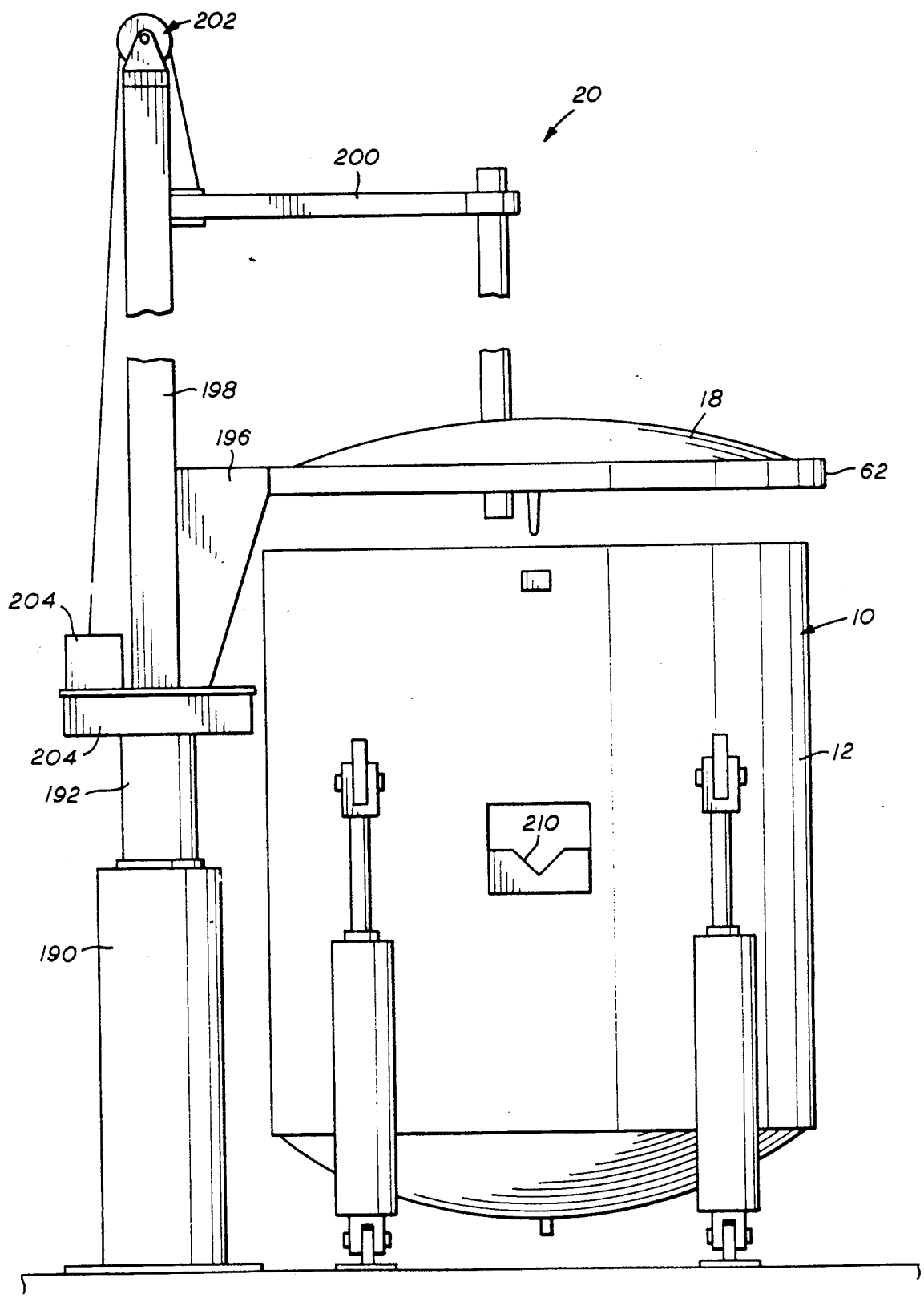
FIG. 6 is a side view of the tiltable electric arc furnace of FIG. 1 showing the mechanism for raising and swinging the roof clear of the furnace.

The details of the swingingly removable or hydraulically retractable roof 18 are shown in FIG. 6. The roof 18 is raised by a hydraulic jack 190 with a rotatable jack rod 192 attached to a platform 194. On platform 194 is a support structure 196 which is attached to and supports the seal lip 62, and the support structure 196 and the lip 62 act as a single structure to lift the roof 18 from the crucible 12. The platform 194 also supports the three electrodes masts 198. Each mast 198 has an electrode supporting arm 200. The electrodes 20 are usually made in six foot sections which may be screwed together. The supporting arm 200 is raised or lowered by a pulley system 202 connected to a powered wench 204. The supporting arm 200 is raised when removing the roof 18 sufficiently that the electrodes 200 are either within the roof 18 or are raised sufficiently to clear the top of crucible 12 before the roof 18 is rotated. The hydraulic system (not shown) for the jack 190 provides a rotation of approximately 90° to the rotatable jack rod 192 when the roof has been raised to a predetermined limit, such as twelve inches. The rotation may be within the cylinder of jack 190 or a separate hydraulic cylinder may be used to rotate the rod 192. On reversing the hydraulic system, the rotatable jack rod 192 is first rotated to place the roof 18 over the crucible and the roof 18 is then lowered. As the roof 18 is lowered the alignment pins 68 center the roof 18 on the crucible 12. A layer of clay may be placed on the top of the crucible 12 for contact with the roof 18 as it is fully lowered to seal the furnace 10.

Figure 7:
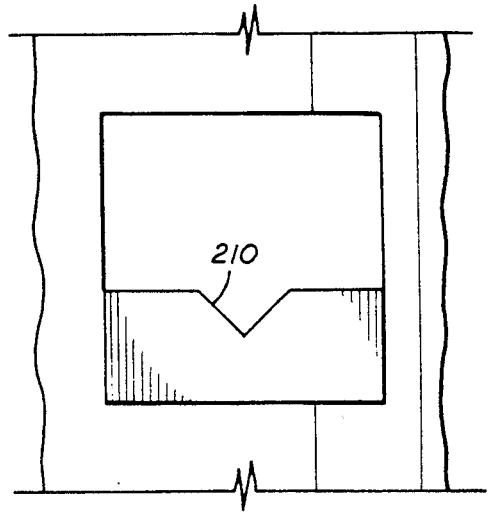
FIG. 7 is a front view of the slag door of the tiltable electric arc furnace of FIG. 1.

Referring now to FIG. 7, there is shown a front view of the slag door 40. The bottom portion 42 and spout 43 form a V 210 made of graphite. The V 210 provides sufficient volume for removal of the slag from the furnace 10.

The furnace system of the present invention has many advantages over the prior art furnaces which have previously been used to recover precious or heavy metals from spent catalyst. The furnace system provides for a continuous processing of feed material or a batch processing whichever is the most convenient. This flexibility is best obtained by use of the tiltable electric arc furnace in contrast to the non-tiltable or static furnace.

As already pointed out hereinabove, additions can be made periodically and slag removed periodically by the simple act of tilting the furnace, whereas before, the non-tilting furnace required the taphole to be pierced for each slag or metal removal which is time consuming and which in itself is a hazardous act.

There is an advantage not only in the time to process a given quantity of feed material, but it is usual in a tiltable furnace to incorporate a mechanism to permit the rapid retractability of the furnace roof whereas in the non-tiltable furnace the roof is usually fixed and it may take a week before the furnace is sufficiently cool to remove the roof and for an operator to enter to remove the precious or heavy metal from the furnace.

The furnace system which includes the tiltable electric arc furnace and the forehearth provide a system where over 95% of the metal desired to be recovered is recovered from the feed material. As pointed out herein above, up to 95% of the precious or heavy metal is recovered in the tiltable electric arc furnace and an additional 3 to 4% is recovered in the forehearth.

The furnace system also includes a conveyor system which continuously may be operated even though feed may be added periodically with great advantage. The removal of iron and other magnetic metal which act as diluent are removed by the conveyor system and the precious metals are recovered in an alloy of over 8% of the precious metal. Without a means for removing the iron the dilution would be such that a minimum requirement by buyer and treaters of the alloy of at least 8% would not be met and the product would not have as high a value. Utilizing the conveyor system, alloys have been recovered having 8 10% precious metals content.

To further illustrate the advantage of the furnace system of the present invention a comparison between operating a tilting electric arc furnace as described and illustrated and one having only a single inlet. The tilting electric arc furnace had a 9 foot diameter fitted with a 3000 kilowatt transformer which supplied the three phased electric power to the electrodes in delta configuration. An industrial catalyst having a support material analyzed 90% aluminum oxide and 10% silicon oxide was melted in the furnace. In addition, calcium oxide was added as flux to give a slag melting point of approximately 1650° C. or 3000° F. This slag melting point is as determined from the system calcium oxide-aluminum oxide-silicon oxide as set forth in FIG. 630 of Phase Diagrams for Ceramists, Volume 1, published by The American Ceramic Society Inc., 1964. The feed from a single point covered the molten surface with difficulty and it was required to manually push with a rabbling tool to maintain furnace efficiency. This contrast with the three point feed which eliminated the manual effort and reduced the loss effect of radiant heat upon the furnace roof. The results of using the tilting electric arc furnace with a single feed point as compared with a triple feed point is set forth in the following Table I.

TABLE I

| Number of Feed Points | Power Consumption KwH/Ton | Melting Rate Ton/24 hours |
|---|---|---|
| 1 | 1250 | 19.9 |
| 3 | 1100 | 25.2 |

| Number of Feed Points | Electrode Consumption Lb/Ton | Dust Collection % of Feed |
|---|---|---|
| 1 | 20.5 | 4.50 |
| 3 | 8.8 | 2.96 |

The advantage of the furnace system of the present invention is clear from the above table.

In addition to the industrial catalyst identified above, automobile exhaust converter catalyst was melted to recover the precious metals of platinum, palladium and rhodium. These precious metals are usually carried on support material of aluminum oxide or on a composite of aluminum oxide and silicon oxide. As in the case of industrial catalyst, a flux of calcium oxide may or may not be added, however, the addition of calcium oxide does lower the melting temperature of the slag. It was found that a good slag composition would contain about 20% calcium oxide to give a slag operating temperature of about 1820° C. or 3300° F. which imparts good fluidity to both slag and metal alloy.

It has been observed that the automobile exhaust converter catalyst contains the metal lead in amounts that range from approximately 0.5% to 4%. It is assumed that the lead comes mainly from motorists using leaded gasoline. When slag temperatures are much below 3200° F. then the lead will accumulate at the bottom of the crucible of the furnace in a molten pool. In that event a collection port 80 as shown is desirable so as not to complicate the collection of the precious metals. At higher temperatures, the lead vaporizes and will pass through the gas exit and enter the dust collection system in the bag house.

Loss of metal to slag is obviously important and should be kept to a minimum. With the furnace system of the present invention it is possible to recover significantly more precious metal by removing the slag from the tiltable electric arc furnace and placing it in the forehearth. It is advantageous to keep the slag in the forehearth under a reducing atmosphere preferably a light covering of coke.

Assays have shown that during normal furnace operations, the loss of platinum to slag can range from 0.3 to 1 oz. per ton depending upon the type of catalyst being fed to the furnace. Although these losses give a recovery of 95 to 97%, tests have shown that recovery is better than 99% if a settling period is provided for the disengagement of the metal from the slag. On the test, the slag removed from the tiltable electric arc furnace was compared to a slag removed from the forehearth. The first slag assayed 0.81 troy ounces per ton, while the metal content in the slag from the forehearth after further settlement of the metal was found to be 0.13 troy ounces per ton.

The slag, even after the removal of the precious or heavy metals, is a valuable product. Since the slag is a non-metallic composition of aluminum oxide and silicon oxide, it may be further treated for recovery of these valuable materials.

The furnace system of the present invention while being described in relation to spent catalyst can obviously be used to melt other materials. The precious or heavy metals may be in such small concentrations (parts per million) that a collector metal such as iron, copper or nickel may be utilized. Usually the non-magnetic iron, as oxides, in the spent catalyst is sufficient to provide the necessary collector metal when reduced in the arc furnace. There is a concentrating mechanism in utilizing a collector metal which permits concentration ratios of up to 100 to 1 or higher. In the case of the heavy metals, they are self-accumulating to give a concentration ratio of about 10 to 1.

The specific embodiment described and the mode of operation is exemplary only and not to be considered limiting. Many variations and modifications of the electric arc furnace and the furnace system are within the scope of the invention.

I claim:

1. A method of recovering precious or heavy metals from spent catalyst comprising the steps of:
   conveying the spent catalyst into the top of the crucible of an electric arc furnace;
   heating the spent catalyst to a temperature above the melting point of the spent catalyst utilizing a plurality of electrodes extending into the crucible to form slag and a lower metal phase;
   cooling the exterior of the crucible to maintain the integrity of the furnace;
   settling the precious or heavy metal from the slag as the metal passes to the lower metal phase beneath the slag;
   tilting the crucible to remove the slag by pouring the slag through an upper slag door and into a forehearth furnace;
   tilting the crucible to remove the precious or heavy metals through a lower tap hole;
   maintaining the heated slag in the forehearth furnace at a temperature and for an additional time such that additional precious or heavy metals are separated from the slag; and
   tilting the forehearth furnace to remove the additional precious or heavy metals by pouring the additional precious or heavy metals through a tap hole in the forehearth furnace to recover such additional precious or heavy metals.

2. The method of claim 1 further including the step of draining lead from a tap hole in the bottom of the crucible.

3. The method of claim 1 further including the step of distributing evenly the spent catalyst materials in the crucible.

4. The method of claim 1 further including the step of circulating a cooling medium around the exterior of the crucible.

5. The method of claim 1 further including the step of conveying the spent catalyst materials into the crucible at a plurality of points.

6. A method of recovering precious or heavy metals from spent catalyst comprising the steps of:
   removing any magnetic metal from the spent catalyst;
   mixing other materials with the spent catalyst to form a feed material;
   providing an electric arc furnace with a crucible;
   employing a plurality of electrodes within the crucible;
   introducing the feed material into the top of the crucible between each of the electrodes and a wall of the crucible;
   passing the feed material between the electrodes and the wall of the crucible;
   heating the feed material to a temperature above the melting point of the composition of the feed material;
   separating the precious or heavy metal from the slag formed when the feed material has been brought to molten temperature;
   providing a settling period to allow disengagement of the precious or heavy metal from the slag;
   settling the precious or heavy metal to the bottom of the crucible;
   forming a slag phase and a lower metal phase as the precious or heavy metal settles below the slag;
   extending the electrodes into the slag phase;
   building up the amount of slag;
   tilting the crucible and pouring the slag through a slag door and into a forehearth furnace;
   adding additional feed material to the crucible and bringing the additional feed material into contact with the slag;
   building up the accumulation of precious or heavy metal in the lower metal phase;
   tilting the crucible to pour the precious or heavy metal through a lower tap hole and recovering the precious or heavy metal;
   maintaining the temperature in the forehearth furnace of the slag poured from the electric arc furnace;
   settling further precious or heavy metals from the slag in the forehearth furnace as the precious or heavy metal passes to the lower metal phase beneath the slag in the forehearth furnace;
   tilting the forehearth furnace to remove the slag through a slag tap hole;
   tilting the forehearth furnace; and
   pouring the precious or heavy metals through a metal tap hole for the recovery and further processing of the precious or heavy metals.

7. The method of claim 6 further including the step of mixing a reducing agent with the feed material prior to introducing the feed material into the crucible.

8. The method of claim 7 wherein said reducing agent is coke.

9. The method of claim 6 wherein the other materials includes calcium oxide.

10. The method of claim 9 wherein the calcium oxide is 20% of the slag.

11. The method of claim 6 further including the step of raising and lowering individual electrodes to maintain equal current to each of the electrodes.

12. The method of claim 6 further including the step of stirring the slag by convection flow.

13. The method of claim 6 further including the step of stirring the slag by an electromagnetic stirring effect around the electrodes.

14. The method of claim 6 further including the step of maintaining the slag in the forehearth furnace under a reducing atmosphere.

15. The method of claim 14 wherein the reducing atmosphere is maintained by a light covering of coke.

16. The method of claim 6 wherein up to 95% of the precious or heavy metal has been separated from the slag at the time the slag is poured from the electric arc furnace into the forehearth furnace.

17. The method of claim 6 wherein over 3% of the original precious or heavy metal present in the feed material is recovered in the forehearth furnace.

18. The method of claim 6 further including the step of draining through a lowermost metal drain any lead accumulated in the bottom of the crucible due to seepage through refractory.

19. The method of claim 6 wherein said precious or heavy metals include platinum, palladium, and rhodium.

20. The method of claim 6 wherein said slag is non-metallic and is composed of aluminum oxide and silicon oxide.

21. The method of claim 6 wherein the slag is poured from the slag door through a graphite spout.

22. A method of recovering precious or heavy metals from spent catalyst comprising the steps of:
   removing any magnetic metal from the spent catalyst which might act as a diluent;

mixing other materials with the spent catalyst to form a proper slag phase;

mixing a reducing agent with the other materials and spent catalyst to form a feed material;

providing an electric arc furnace with a crucible having a bottom, cylindrical walls, and a roof;

employing a three electrode delta configuration within the crucible with alternating three-phase current;

introducing the feed material into the top of the crucible between each of the three electrodes and the wall of the crucible;

passing the feed material between the electrodes and the wall of the crucible;

heating the feed material to a temperature above the melting point of the composition of the feed material;

separating the precious or heavy metal from the nonmetallic slag formed when the feed material has been brought to molten temperature;

providing a settling period to allow disengagement of the precious or heavy metal from the slag;

settling the precious or heavy metal to the bottom of the crucible;

forming a slag phase and a lower metal phase as the precious or heavy metal settles below the slag;

extending the electrodes into the slag phase;

dissipating extra heat through refractory in the walls of the crucible;

cooling the exterior of the electric arc furnace to maintain the integrity of the furnace;

raising and lowering individual electrodes to maintain essentially equal the current to each of the electrodes;

building up the amount of slag;

tilting the crucible through an arc which passes through the center of a slag door and a metal tap hole in the crucible;

pouring the slag through the slag door and into a forehearth furnace;

adding additional feed material to the crucible and bringing the additional feed material into contact with the slag;

stirring the slag by convection flow and electromagnetic stirring effect to contact the slag with the additional feed material;

building up the accumulation of precious or heavy metal in the lower metal phase;

tilting the crucible to pour the precious or heavy metal through the lower tap hole and recovering the precious or heavy metal in a mold;

maintaining the temperature in the forehearth furnace of the slag poured from the electric arc furnace;

heating the slag in the forehearth furnace with a single phase alternating current two electrode system;

maintaining the slag in the forehearth furnace under a reducing atmosphere;

settling further precious or heavy metals from the slag in the forehearth furnace as the precious or heavy metal passes to the lower metal phase beneath the slag in the forehearth furnace;

tilting the forehearth furnace to remove the slag through a slag tap hole;

pouring the slag into molds;

cooling the slag in the molds for further processing;

tilting the forehearth furnace; and pouring the precious or heavy metals through a tap hole into another container for the recovery and further processing of the precious or heavy metals.

* * * * *